United States Patent [19]
Bravo

[11] Patent Number: 5,955,657
[45] Date of Patent: *Sep. 21, 1999

[54] PIPE LAYOUT WITH OPPOSING INCLINE

[76] Inventor: Sergio M. Bravo, 2872 Tigertail Dr., Los Alamitos, Calif. 90720

[ * ] Notice: This patent issued on a continued prosecution application filed under 37 CFR 1.53(d), and is subject to the twenty year patent term provisions of 35 U.S.C. 154(a)(2).

[21] Appl. No.: 08/829,827

[22] Filed: Mar. 25, 1997

[51] Int. Cl.⁶ .............................. G01M 3/18; F17D 1/08
[52] U.S. Cl. .................. 73/40.5 R; 138/114; 137/236.1; 137/312; 137/363
[58] Field of Search .............................. 73/40.5 R, 49.1, 73/49.2; 138/104, 114; 137/371, 236.1, 312, 363, 364, 368, 372, 558, 571, 356, 373, 285; 141/88, 86, 95; 405/52; 222/108, 40, 51; 52/19; 588/289, 249, 260

[56] References Cited

U.S. PATENT DOCUMENTS

| | | | |
|---|---|---|---|
| 3,721,270 | 3/1973 | Wittgenstein | 73/49.1 |
| 4,842,163 | 6/1989 | Bravo . | |
| 4,971,225 | 11/1990 | Bravo . | |
| 4,971,477 | 11/1990 | Webb et al. | 405/52 X |
| 5,100,024 | 3/1992 | Bravo . | |
| 5,257,652 | 11/1993 | Lawrence | 405/52 |
| 5,285,829 | 2/1994 | Bravo | 141/88 |
| 5,341,857 | 8/1994 | Bravo | 141/88 |
| 5,527,130 | 6/1996 | Webb | 405/52 |
| 5,529,098 | 6/1996 | Bravo | 137/312 X |
| 5,590,981 | 1/1997 | Osborne | 405/52 X |

*Primary Examiner*—Michael Brock
*Attorney, Agent, or Firm*—Cislo & Thomas LLP

[57] ABSTRACT

A pipe layout system for secondary containment includes alternating deep and shallow penetration holes in containment boxes installed below gasoline dispensers, and a double-walled pipeline inclined downward from each shallow box to an adjacent deep box. Each deep box has a fitting which closes the end of the secondary piping within the containment box. These fittings have apertures positioned to face downward and communicating with a conduit which leads to a sensor mechanism at the low point of the conduit. If there is leaking gasoline within the secondary pipes, it will flow to the deep box, through the hole, and down to the sensor. A small amount of gasoline is all that is necessary to trip the sensor and shut down the primary product pipeline. In the shallow boxes, the same fitting is used to close the ends of the secondary piping, and the aperture therein is preferably positioned upward. A jumper hose may be used between the apertures and the fitting in the shallow box to pressure-test the secondary line. The invention enables production of only two types of boxes, a deep box and a shallow box, regardless of how many dispensers are connected along the same product pipeline. An exception is that an end of the product line box will have only one penetration hole.

23 Claims, 6 Drawing Sheets

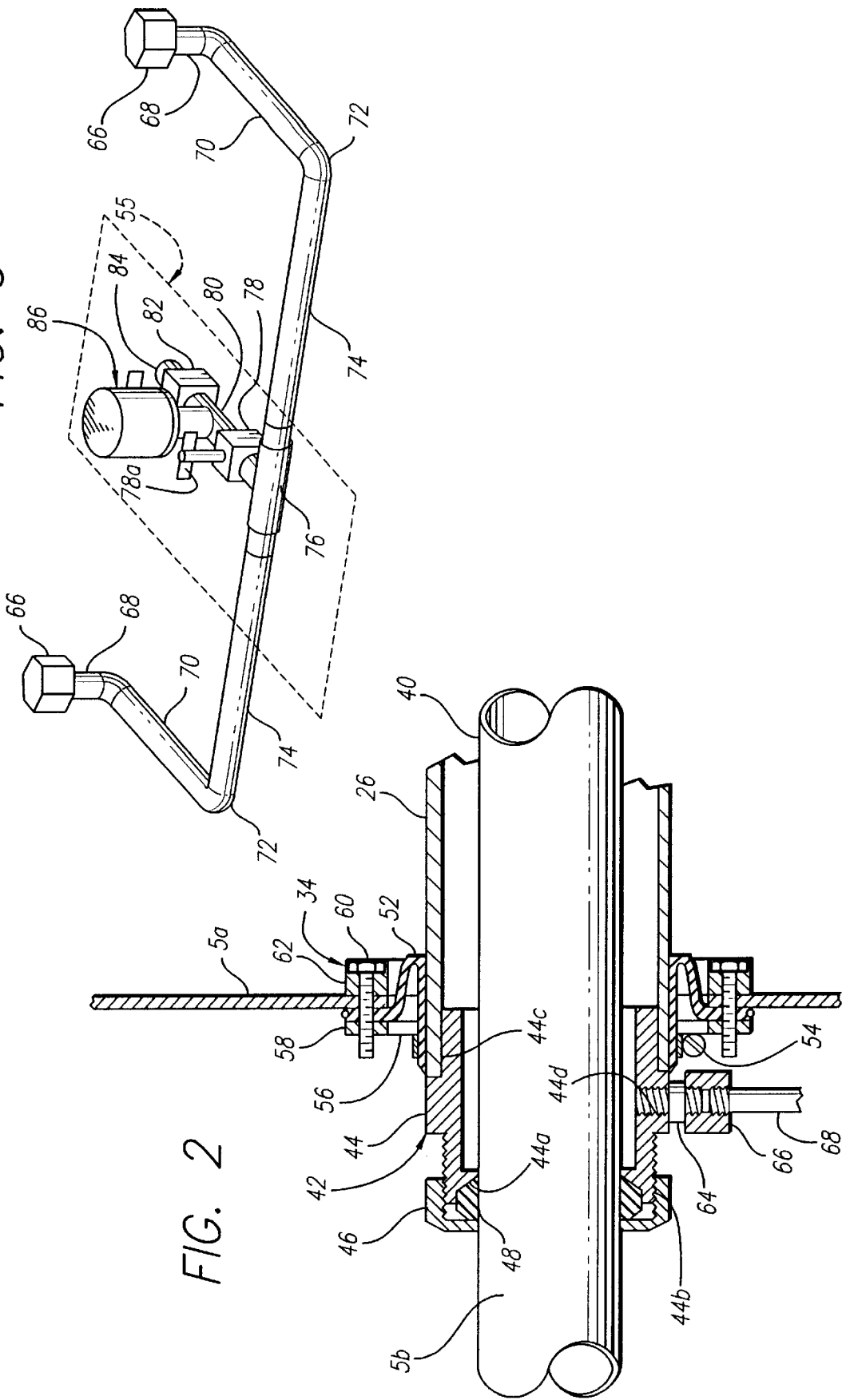

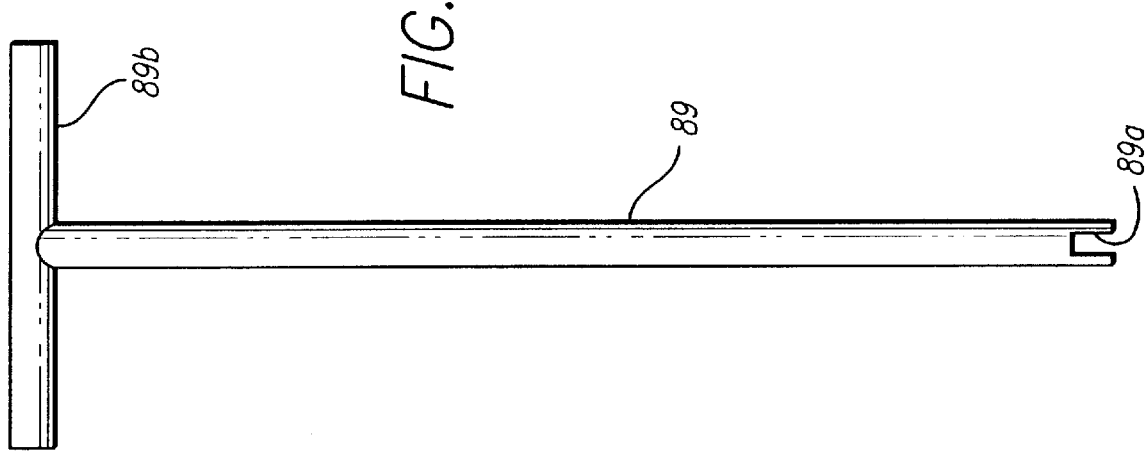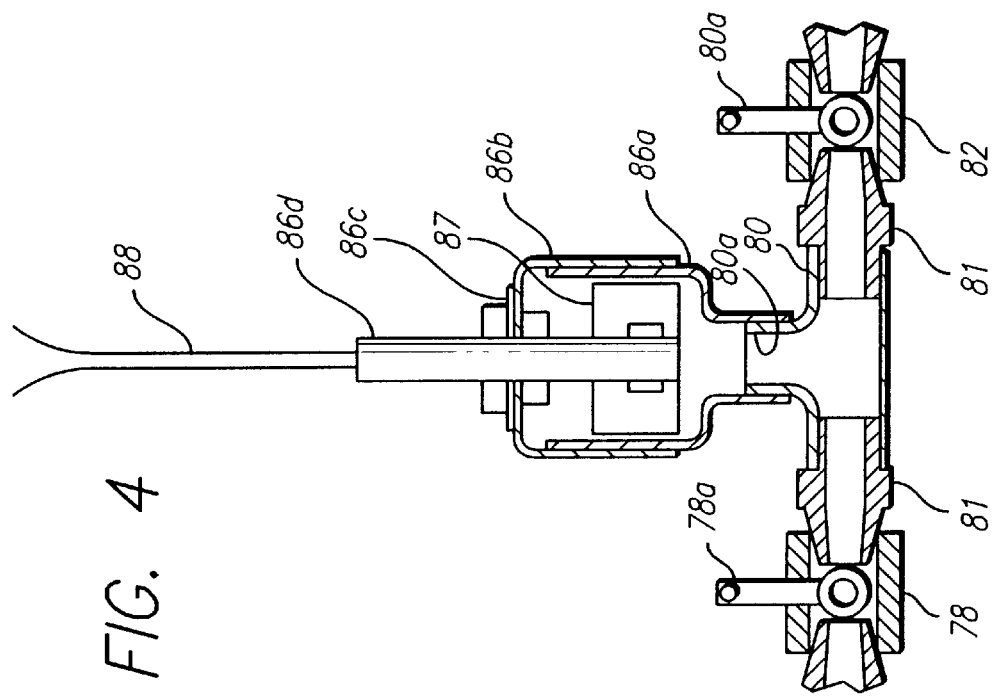

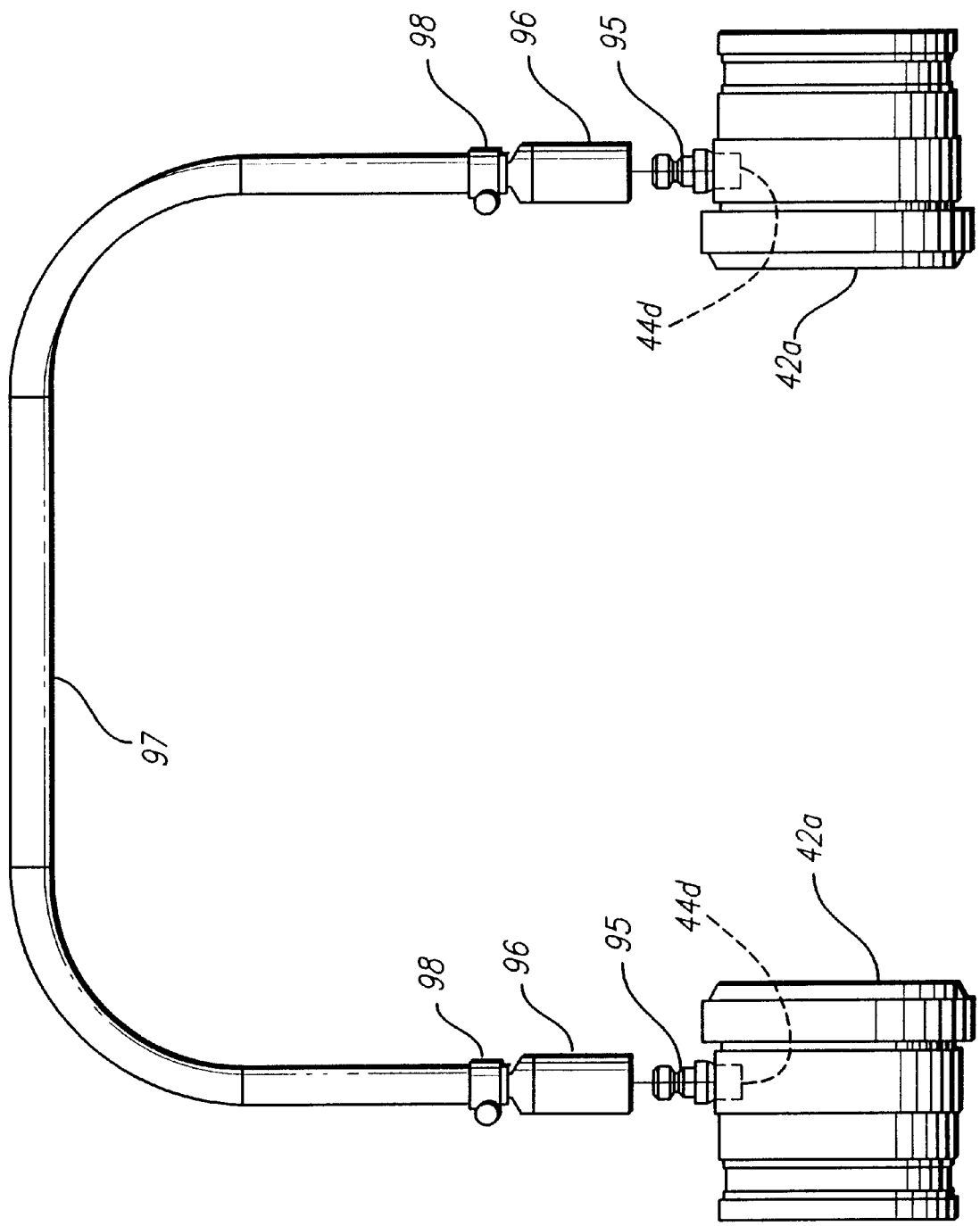

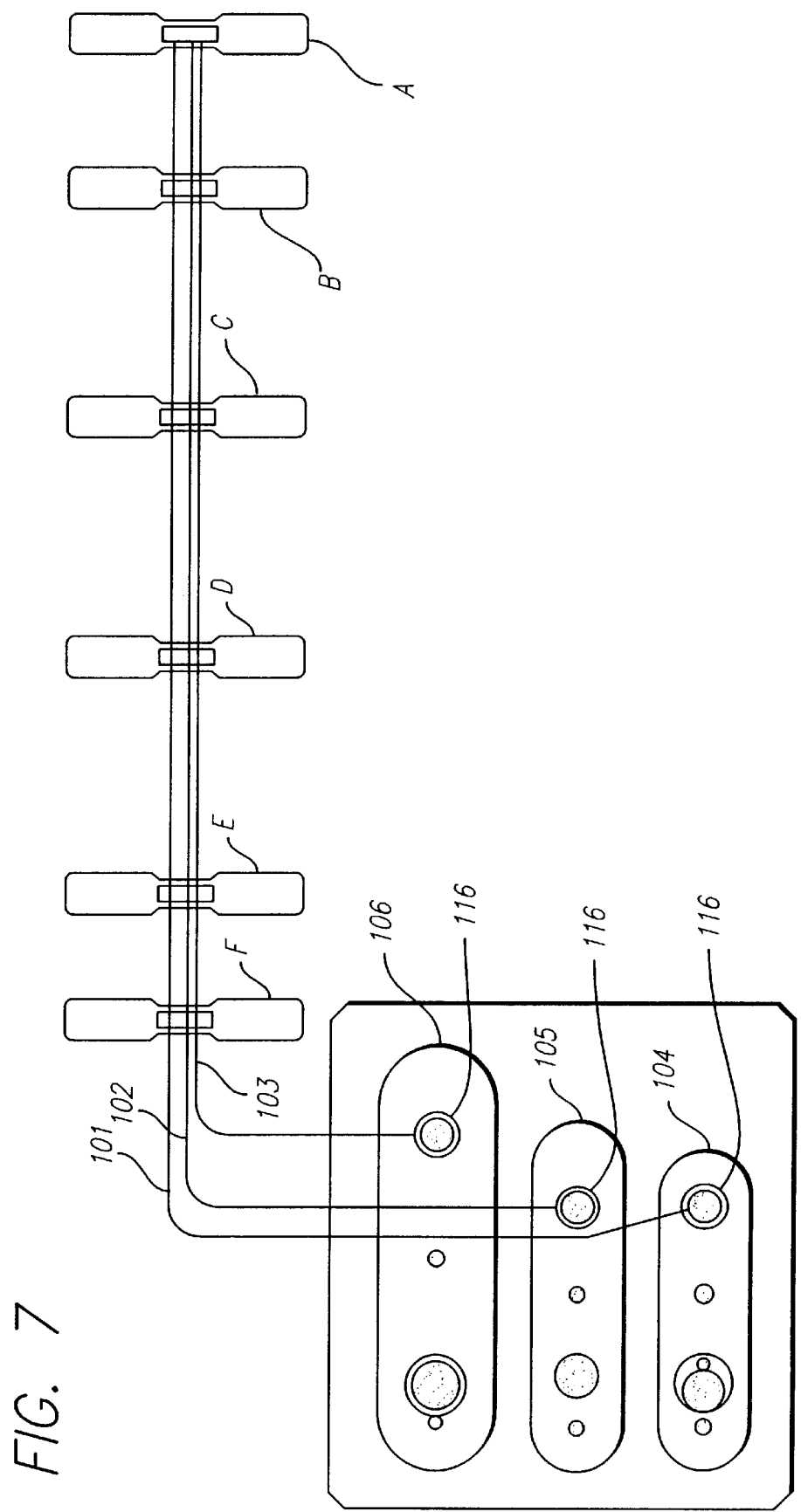

PIPE LAYOUT WITH OPPOSING INCLINE

BACKGROUND OF THE INVENTION

1. Field of the Invention

The present invention relates to a pipe layout system for gasoline handling equipment, and more particularly, to a pipe layout system for service stations with secondary containment pipes and a system to test for leaks in such pipes, and most particularly, where several dispensers have the same pipeline in common.

2. Background of the Invention

For some time now, gasoline handling equipment, such as gasoline dispensers, and the piping connecting such dispensers with underground gasoline tanks and pumps has been made with secondary containment. That is, due to environmental concerns favoring prevention of leaking gasoline from entering the ground, the pipes have a second pipe around them, and the dispensers and underground pump have a box-like structure below them. An example of such a box and secondary containment is shown in U.S. Pat. Nos. 5,285,829 and 5,341,857, both to the present inventor. Typically, for each product line, such as 87 octane, there is a separate pipeline. At the dispenser, there is an impact valve which will shut off the flow of gasoline to the dispenser in the event of a vehicle colliding with the gasoline dispenser or other disaster. The above-mentioned patents show that the impact valve may also be connected to a float mechanism for detecting leaking gasoline that is collected within the dispenser. The lifting of the float mechanism will shut off the impact valve. In addition, in such systems, it is common to provide a light, bell, or other warning signal, including the shutting off of the dispenser itself, to alert the station attendant that there is a problem with that dispenser. The float system will also detect water and will operate in the same manner as in response to gasoline.

In such systems, it is industry practice and often mandatory under the fire codes or pursuant to the fire marshal's request to have a mechanism to detect leaking gasoline in the primary pipeline, which then would get into the secondary pipeline or containment boxes. At each containment box, the secondary pipeline can either be left open, as the box itself provides secondary containment, or completely closed. However, if the line is left open, it cannot be pressure-tested. Typically, codes require that the secondary line be pressurized and hold a minimum pressure, e.g., 5 psi, for a minimum time. Therefore, the secondary containment line is either closed by means of a plug inside the containment box, or closed is and connected all the way through the box. The latter structure is somewhat cumbersome.

Because of the leak detection requirement, the pipelines are inclined downward from the outermost dispenser with respect to the underground storage tank. A typical incline is one-eighth (⅛) inch per one foot of pipeline. A common distance between concrete islands center to center for each dispenser is about twenty (20) feet. The total vertical incline will be two and one-half (2½) inches over twenty (20) feet for a ⅛ inch per foot drop. Since the pipes incline from the underground tank to the last dispenser along a pipeline, when there are several dispensers served by one product line, there can be a very significant vertical drop in the line. This necessitates the use of a different size containment box under each dispenser. Therefore, if there are three (3) dispensers, there must be three (3) different depth boxes (or one depth with three different places for penetration of the pipeline depending under which dispenser it is installed). Typically, the highest box's penetration hole is eighteen (18) inches from the concrete of the island to the middle of the primary pipeline, as a minimum required by local regulators or agencies. The next deepest holes would then be two and one-half (2½) inches deeper, and the third deepest holes would be five (5) inches deeper. Therefore, the excavation for the deeper boxes is more cumbersome. This problem is exacerbated when service stations have more than three (3) dispensers. In fact, it is not uncommon at truck stops and the like to have about six (6) or seven (7) concrete islands. Therefore, the deepest boxes must be installed quite deep, as well as being custom-made, depending on the distance from center to center of each successive island. More importantly, a standard tank depth is about four (4) feet, but with six (6) dispensers the tank depth would have to be well deeper than four (4) feet. This would necessitate a major expense to lower the fuel tank. In a new is installation, it is still expensive to excavate deeper for the tank, and certain local requirements may prohibit too deep a tank.

It should be noted that the float leak detection system of the above-mentioned patents could be used to detect a leak in the dispenser or pump pipeline, but the impact valve only shuts down the dispenser where the box is located. If the entire product line is shut down by turning off the pump in response to detection by a float mechanism in any given containment box, this will result in significant loss of customers and lost service. In fact, providing any kind of detection in a containment box which shuts down the pump for the entire line suffers from this problem.

There is also a problem that service station attendants or owners will often disconnect the float mechanism, particularly if the box has been poorly installed and water tends to get into the box setting off the float.

In view of the above, there is a great need for a detection system which can shut down the primary (product) line, but only in response to leaks in the primary pipeline and not in response to water or a local leak within a containment box. In addition, there is a great need for avoiding excavating deeply and providing numerous types of boxes where, in particular, more than three dispensers are connected along one product line. This creates an almost impossible situation to get access inside the box from a finished concrete floor or repair a penetration fitting or a leaking pipe, or components.

SUMMARY OF THE INVENTION

The present invention provides a leak detection system along with containment boxes which are only at two depths, or the apertures in the side thereof are only at two depths. In the system, there is what is referred to as a "shallow depth hole" (or shallow hole or box) and a "deep depth hole" (or deep hole or box). In the deep and shallow hole boxes, the secondary pipeline is sealed off at its end point located within the box. An opening is provided in a fitting around the secondary pipe, which opening communicates the area between the primary and secondary pipe with the inside of the containment box. The opening is oriented downward. A primary pipeline leak detection system includes piping connected to the hole which leads to a detection mechanism (e.g., a level sensor) separate and distinct from the float mechanism within the box. The detection mechanism is a closed system, and when gasoline gets into the system it flows to the sensor and actuates it. The sensor sets off a signal which shuts down the pump, and also preferably flashes a light, rings a bell, or makes another external signal, which may merely include the shutting down of the pump.

This primary pipeline leak detection system is located in the deep box. In a shallow box, the same kind of opening is provided in the secondary pipeline, but it is oriented upward and a hose with quick disconnect couplings and adaptor for connecting the openings in each secondary pipeline within the box is provided for pressure testing. Preferably, the hose is disconnected during normal operation of the system and stored to be used by repair mechanics or for testing. The deep and shallow boxes are alternated, so that piping always inclines downward from a shallow box to a deep box and then inclines back upward to the next shallow box. This alternating structure allows the use of two box depths only, or two different pipe hole locations in one standard depth box. Therefore, regardless of how many dispensers are connected to a single product line, only two types of boxes will be needed.

The closed system also prevents water which leaks into the containment box, or gasoline that has leaked into the containment box, from being detected by the system which will shut down the entire product line.

The system also provides a fail-safe where a station owner or attendant might disconnect the float system in the box. In such a case, ground water or gasoline when it reaches a certain height will flow into the hole in the fitting of the secondary pipeline or in the secondary pipeline itself and flow down to a low box where, when detected, will shut down the product pump.

BRIEF DESCRIPTION OF THE DRAWINGS

FIG. 2 is a detailed vertical sectional view of a right-side connection of the supply pipeline and secondary pipeline taken along a line 2—2 of FIG. 1, shown for a deep box, the left-side view being a mirror image thereof;

FIG. 3 is a detailed perspective view of a primary pipeline leak detection system of FIG. 1 for a deep box;

FIG. 4 is a detailed schematic view of a detection mechanism and its connection to valves of FIG. 3;

FIG. 5 is a side view of a tool for opening and closing the valves;

FIG. 6 is a side view of details of a jumper hose connection for a shallow box of FIG. 1;

FIG. 7 is a schematic view of a pipeline layout for a service station in accordance with the invention.

DESCRIPTION OF THE PREFERRED EMBODIMENT(S)

Figure 1:
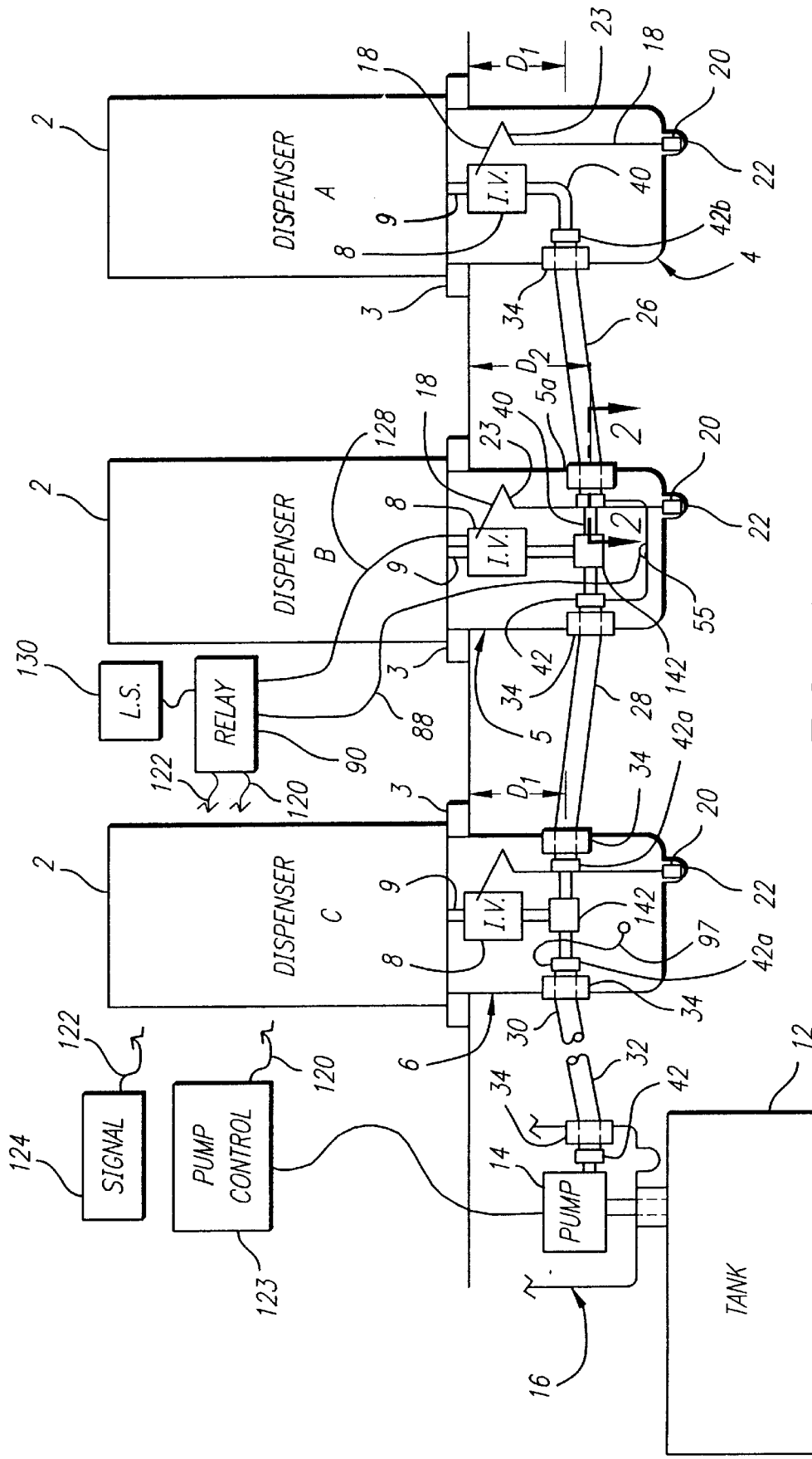
FIG. 1 is a schematic view of a service station showing a layout of dispensers, the underground tank, the underground pump, the product line and secondary containment system with a primary pipeline leak detection system, according to the invention.

FIG. 1 shows a service station with three (3) dispenser islands. As is typical in service stations today, each dispenser island may have three or more different types of dispensers, such as for 87 octane, 89 octane, 92 octane, and diesel fuel. Each dispenser 2 sits on an island 3 and has a secondary containment box 4, 5, 6 attached to its underside. The secondary containment box may be of a type such as in U.S. Pat. Nos. 4,971,225, 4,842,163, or 5,135,324, all to the present inventor, and all incorporated by reference herein. The boxes have impact valves (I.V.) 8 where fuel from a primary pipeline 40 passes through to each dispenser 2 via a connecting pipe 9. The primary pipeline, as is well known in the art, carries gasoline from an underground storage tank 12 to the impact valves and is pressurized by a submersible pump 14. The pump 14 is located in a sump box 16, which may be constructed similar to the containment boxes as it performs a similar leak collection function with an electronic shut down of the pump. As disclosed in the above-referenced three patents, each impact valve 8 is connected by a chain-and-lever mechanism 18 to a float 20 located, preferably in a well 22 formed in each box. This structure applies equally to each containment box and the sump 16, but is only shown for purposes of simplicity in containment box 5.

The impact valve will be shut off preventing the flow of fuel product to the dispenser in which it is located, if a sufficient amount of liquid collects in the well 22 to move the float 20 located therein upward and pull on the chain connected to the impact valve by a lever mechanism 23, as explained more fully in the above-mentioned three patents. Each secondary pipe 26, 28, 30, and 32 is sealed to a containment box wall, or the sump wall by means of a flexible penetration fitting, such as in U.S. patent application Ser. No. 08/714,471, filed Sep. 16, 1996, by the subject inventor and entitled FLEXIBLE PENETRATION FITTING, incorporated by reference herein. Each penetration fitting 34 may be identical and is constructed as shown in detail in FIG. 2.

FIG. 2 shows penetration fitting 34 attached to the right wall 5a box 5, but the same structure positioned in mirror image works for attachment to the left wall of each box or sump. The primary pipeline 40 is shown passing through the secondary pipeline 26. The primary pipeline 40 may actually consist of many pipes and fittings as is well known in the art. The secondary pipeline 26 is sealed to the primary pipeline 40 inside the box by a fitting assembly 42. Penetration fitting 34 and fitting assembly 42 may also be used in sump box 16. A similar fitting to fitting assembly 42 is shown in U.S. Pat. Nos. 5,341,857 issued Aug. 30, 1994, and 5,285,829 issued Feb. 15, 1994, to the present inventor, incorporated by reference herein.

The fitting assembly 42 has a body 44 and a nut 46. A rubber or elastomeric deformable doughnut 48 is disposed between an inner wall of the nut 46 and an outwardly facing wall 44a of body 44. The body has an outwardly threaded surface 44b, onto which the nut threads. This compresses the deformable doughnut 48 and seals it against the primary pipe 40. The secondary pipe 26, after passing through an aperture in the wall 5a, fits around a notch 44c in the body 44. A suitable epoxy for the gasoline and underground environment may be used to fix the primary pipe 26 to the notched surface 44c of body 44.

The flexible penetration fitting 34 which seals the secondary pipe to the wall of the containment box, includes an elastic sleeve 52, which is bent, and a band clamp 54 to tighten the sleeve against the secondary pipe. In this construction, the band clamp also helps hold the secondary pipe against the body 44 of the fitting. The elastic sleeve may be given some rigidity by a metal or other rigid ring 56. A nut 58 and bolt 60 press one end of the sleeve and an elastomeric ring 62 against each side of wall 5a to complete the seal.

The body 44 of the fitting assembly 42 has an aperture 44d communicating the exterior of the fitting with its interior. This communicates the space formed between the primary pipeline 40 and secondary pipe 26 with the interior of the containment box. The opening 44d is preferably threaded and is oriented in the box 5 in a downward direction. A doubly threaded coupling member 64 threads into the hole 44d and allows a nut 66 to couple the coupling member with the threaded end of a pipe 68, such as a copper or stainless steel pipe. The pipe 68 as shown in detail in FIG. 3 may itself be an elbow member, or may lead to an elbow member. Then, straight pipes 70, elbows 72, straight pipes 74 connect to a T-fitting 76 at each end thereof. The stem 76a of the T-fitting then connects directly or by means of further piping to a valve 78 having a valve handle 78a. The far side of the valve 78 connects directly to one end of another T-fitting 80, or indirectly by means of further piping is or a connector 81 (FIG. 4). A second valve 82, having a handle 82a, is connected to the other end of the T-fitting 80 by another connector 81. A short open-ended segment of pipe 84 connects to the other side of the second valve 82. The stem 80a of the tee 80 is directed upward and connects to the base of a level switch assembly 86. Such a level switch may be provided by a "Buna N Float," e.g., LS-1700 Series, such as manufactured by Gems. The level switch is shown schematically in FIG. 4 and may be electronic, magnetic, mechanical, or other suitable detection system. The switch has a bottom member 86a which couples to the tee stem 80a. It also has a movable float member 87 which will move upward with the presence of liquid. As it moves upward, it will contact with or magnetically respond to an electrically conductive upper portion 86b and will, by virtue of closing the (magnetic, electrical or otherwise) coupling, send a signal through wiring 88 to a relay box 90 (FIG. 1). The level switch and valve assembly structure is identified by box 55 in FIGS. 1 and 3.

The switch top member 86b is connected to tubing 86d in which the wire 88 is located. This tubing extends, e.g., for two (2) feet upward so that the top member 86b can easily be removed and replaced by using the tube, for inspection by mechanics or the fire marshall. The top member 86b has an aperture 86c formed in it to allow for air flow. This hole can also function as a fail-safe for situations where the mechanical float system does not work or where the level switch does not work. In addition, the wires 88 may be looped at one point or otherwise held close together, so that in the event of a fire in the box, the wires will melt, cause a short, and stop the pump.

FIG. 5 shows a simple T-shaped tool 89 having a notch 89a in its base which allows its handle 89b to be turned while the notch 89a engages whichever valve handle 78a, 80a the operator wants to open or close.

The structure in a shallow box, containment box 6, is similar to deep box 5 except that there is no primary pipeline leak detection system. Rather, there is a compression test jumper system. The primary and secondary pipelines are constructed as in containment box 5, the only difference being that the fitting 42a, which is identical to fitting 42, is preferably disposed so that the aperture 44d is directed upward for convenience. In this direction, it may be readily used for the jumper system. Specifically, as shown in FIG. 6, the threaded aperture 44d is directed upward for each fitting 42a. Aperture 44d receives an air hose plug fitting 95 threaded into it, to receive, e.g., by friction fit, a socket member 96. The plug and socket may be a quick disconnect hose coupling. The socket member 96 has a male end which faces upward and which has a tube 97 band-clamped by clamps 98 to it. As in the structure within box 5, the apertures 44d of the fittings 42a communicate the space between the primary and secondary pipes with the inside of the containment box. The jumper hose 97, when connected to the socket members 95, allows air to pass through the hose, thus closing the system for air pressure testing.

With the above structure, operation of the system will now be described.

The system is constructed so that the primary pipeline leak detection system will be located in a containment box, such as box 5, that has its secondary piping ending at a low point while the secondary piping connected to adjacent boxes are located at higher points. This alternating of high and low points achieves the goals of providing only two box types: depth D1 for a shallow box such as boxes 4 and 6 and depth D2 for a deep box such as box 5 in FIG. 1. The points where the pipeline penetrates the walls of box 5 are lower in the box versus higher in shallow boxes 4, 6. In a typical installation, the shallowest depth from the top of the concrete island 3 to the center of the primary product line where the box is penetrated is eighteen (18) inches. In the deep box, this could be about twenty and one-half (20½) inches, given the distance from center to center between islands of twenty (20) feet with a one-eighth (⅛) inch per linear foot drop in the pipeline. Accordingly, no matter how many dispensers are connected to the same product line, and no matter how far apart dispensers are located, it is possible to have only two types of boxes, which need not get progressively deeper.

It should be noted that the boxes 4, 5 and 6 are shown as the same size, and the penetration points are shown at different heights in box 5 relative to boxes 4 and 6. However, box 5 could be made deeper than boxes 4 and 6, and have penetration points at the absolute depth as in the current embodiment.

FIG. 7 shows a layout with more than three dispensers, i.e., six dispensers A through F in line. There are three product lines 101, 102, 103, from tanks 104, 105, 106, respectively. The end dispenser A may have a containment box with the structure such as that shown in FIG. 1, and may be a shallow box. The only difference between this box and the shallow box 6 is that it has a pipeline extending only through one end and thus the primary pipeline 40 does not require a T-element between it and the impact valve 8. Dispenser B would have a deep box such as box 5 below it. Dispenser C has a high box, such as box 6, below it. Dispenser D has a deep box such as box 5. Dispenser E has a shallow box such as box 6. Dispenser F has a deep box such as box 5. The sump 116 where the pump is located can be even deeper than the deep box, as is sump 16 in FIG. 1. Regardless of how many dispensers are provided along a single product line, the containment boxes need only have two penetration hole depths.

The depth of the above-mentioned penetration holes and boxes will vary depending upon the slope or landscaping of the station.

Figure 8:
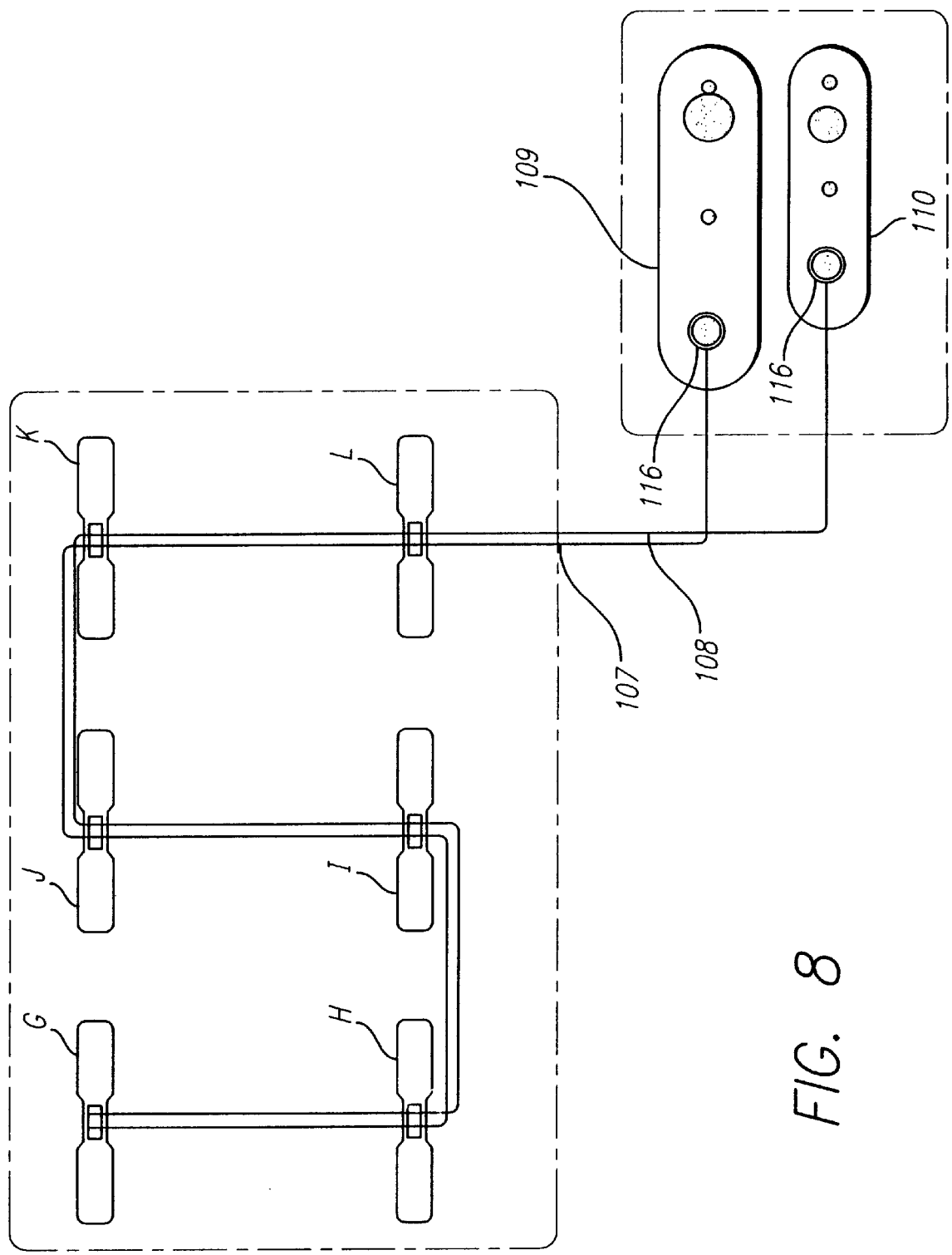
FIG. 8 is a schematic view of an alternative layout to that of FIG. 7.

FIG. 8 shows primary product lines 107 and 108 from tanks 109 and 110, respectively. These pipelines have dispensers G through L along them. The containment box below dispenser G may be like box 4 of FIG. 1. The containment boxes below dispensers H, J, L may be like box 5. The containment boxes below dispensers I and K may be like box 6. Box G is like box 4. Again, no matter how many containment boxes are provided along a product line, their penetration hole depth need only be at two levels. This makes it easy to make boxes of overall uniform dimensions, only the penetration hole position being varied, and only varied in two ways.

Returning to FIGS. 1, 4, and 6, leak detection occurs as follows: during normal operation of the system, the jumper hose 97 is disconnected from at least one end or both. This allows any leaking gasoline to readily flow if located between the primary and secondary pipeline. In addition, it provides a fail-safe system as described later. The valve 78 is normally open and the release valve 82 is normally closed.

If there is a leak in the primary pipeline anywhere between the right-fitting 42a in box 6 and the left-fitting 42 in box 5, or the right-fitting 42 in box 5 and the fitting 42b in box 4, the gasoline will flow down through the opening in the lower fittings 42 into the primary pipeline leak detection system and with a relatively small amount will actuate the level switch 86. Wires 88 will signal the relay box 90 and a signal will be sent along wire 120 to the pump control 123 for the product line along which the primary pipeline leak detection system 55 is installed. This signal will shut off the pump 14 for that line. FIG. I shows lines 120 and 122 which may be connected directly to the main signal box 124 and pump control 123, or indirectly by connecting in series to each relay box at each dispenser along the same product line for ease of installation.

In addition, the signal may be sent along wire 120 or along another wire 122 to a main signal box 124, which may be a flashing light, bell, alarm, or other signal, which will alert the station operator that the primary pipeline has been shut down due to a leak detection. Since this system is closed, water or gasoline leaking in any particular containment box will not cause the pump control 123 to shut down. It should be noted that if the standard float mechanism in box 5 is actuated, a signal will be sent along wire 128 to the relay box 90 to actuate a local signal 130. This will alert the station operator that there is a leak within that particular containment box. This local signal can also be used when the primary pipeline leak detection system causes the pump control to shut down, or a separate local signal box may be used, to indicate the particular containment box where the primary pipeline leak detection system has detected a leak. This will narrow down the location of the leak in the primary pipe.

A similar primary pipeline leak detection system may also be placed in the sump 16, using just one fitting 42 connected to a level switch, but typically the float mechanism within a well formed in the sump will be connected to the pump control. There can also be a local signal in addition to actuating signal 124 or in place of it to indicate gasoline within the sump. Water getting into the sump is usually not as big a concern as in the containment boxes because the sump is normally sealed with a watertight cover. Such a watertight cover is described in U.S. Pat. No. 5,474,396 issued to the present inventor.

After gasoline has set off the primary pipeline leak detection system, the release valve 82 may be opened to drain the gasoline and then closed to ready the system for future detection. As mentioned above, leaving the jumper hose open at at least one end, if not both, provides a fail-safe in case, for example, the float mechanism is disconnected in a high containment box. Gasoline will enter the aperture 44d in the fitting 42a and flow downward in the same way as if there were a leak in the primary pipeline. This will shut down the system and the leak can then be spotted. The box may also be drained at that point. As fitting 42b can also be constructed with a hole 44d, it too will provide this fail-safe function.

When pressure-testing the system, the jumper hose is connected in the high (shallow) box between the two fittings 42a, an identical fitting may be used in the sump in place of fitting 42 and may have a pressure gauge attached to it, and the line may be tested at the fitting 42b. Alternatively, the fitting 42b may have a pressure gauge and the line may be tested at the fitting in the sump. Numerous variations are possible. It should be noted that during pressure-testing, the valve 78 leading to the level switch should be closed.

Finally, a suitable T-fitting 142 of FIG. 1 in containment boxes 5 and 6 is well-known in the art. Primary pipeline 40 may be connected directly to it or by means of other kinds of fittings.

It is understood by those skilled in the art that changes in the form and detail of the above-described embodiments may be made without departing from the spirit of the invention. For example, a level switch does not have to be used in the primary pipeline leak detection system. Another type of detector which can detect liquid or gasoline may be used in its place. Other structures for sealing the primary pipeline may be used. The threaded aperture need not be through the body of the fitting, but could be through a portion of the nut used to seal the primary pipeline, or even in the secondary pipeline itself, which would then be communicated with the pipeline leak detection system in accordance with the invention.

What I claim is:

1. In an underground flammable fluids handling system, wherein there is a primary pipeline, a secondary pipeline around at least a portion of the primary pipeline, and at least first, second, third, fourth and fifth adjacent flammable fluids containment boxes located along the primary and secondary pipelines in the ground, the improvement wherein the relative depth of the primary pipeline in the first box is at a first depth relative to a level ground and the relative depth of the primary pipeline in the second box is at a second depth greater than the first relative to the level ground, the relative depth in the third box of the primary pipeline is a third depth which is less than the second depth, the relative depth of the primary pipeline in the fourth box is a fourth depth which is greater than the third depth, and the relative depth of the primary pipeline in the fifth box is less than the fourth depth, such that the primary pipeline and secondary pipeline are inclined downward from the first box and third box to the second box located therebetween, and from the third box and fifth box downward to the fourth box located therebetween, whereby the second box represents a gravitational low point of the primary pipeline and secondary pipeline for the first, second and third boxes, and the fourth box represents a gravitational low point of the primary pipeline and secondary pipeline for the third, fourth and fifth boxes, wherein each of the first, third and fifth boxes are a first size, and each of the second and fourth boxes are a second size, and wherein the first, third and fifth relative depths are the same and the second and fourth relative depths are the same.

2. The flammable fluids handling system of claim 1, wherein the second and fourth boxes each contain a primary pipeline leak detection system for detecting flammable fluids leaking from the primary pipeline to a space between the primary pipeline and secondary pipeline by means of the flammable fluid flowing through the secondary pipeline to at least one of the second box and the fourth box through an aperture formed in the secondary pipeline in closed communication with the primary pipeline leak detection system.

3. The flammable fluids handling system of claim 2, wherein the leak detection system comprises a sensing device for sensing and responding to a minimum level of liquid, and means for communicating the aperture with the sensing device.

4. The flammable fluids handling system of claim 3, wherein the means for communicating includes a valve which is normally open, for closing communication between the aperture and sensing device, whereby the secondary pipeline can be pressure-tested when the valve is closed.

5. The flammable fluids handling system of claim 4, wherein the leak detection system further includes another valve disposed downstream of the sensing device and in normally closed position, for draining, flammable fluids when opened to ready the system to detect subsequent flammable fluid leaks.

6. The flammable fluids handling system of claim 2, wherein the system further comprises a pump for pumping flammable fluid through the primary pipeline, and means responsive to detection of fluid by the primary pipeline leak detection system for shutting down the pump to stop the flow of flammable fluid in the primary pipeline for the entire pipeline.

7. The flammable fluids handling system of claim 2, wherein each box has a means for detecting leaking fluid collecting in each box, whereby leaking fluid from the secondary pipeline and any flammable fluids handling equipment located in each box may be detected.

8. The flammable fluids handling system of claim 2, wherein at least the third box has the primary pipeline and secondary pipeline enter it at first and second locations, the system further comprising first and second means for sealing the primary pipeline to the secondary pipeline inside the third box proximate the first and second locations, each means for sealing having an aperture formed therein, and wherein the third box has a means for detecting leaking fluid collecting therein, whereby leaking fluid for the secondary pipeline may be detected, and the means for detecting will act as a failsafe for the primary pipeline leak detection system.

9. The flammable fluids handling system of claim 1 wherein the second and fourth boxes contain a primary pipeline leak detection system for detecting flammable fluids leaking from the primary pipeline to a space between the primary pipeline and the secondary pipeline, the primary pipeline and secondary pipeline enter each of the second and fourth boxes in two places, and there are means for sealing the primary pipeline to the secondary pipeline at each place, the leak detection system comprising an aperture formed in each means for sealing.

10. The flammable fluids handling system of claim 1, wherein at least the third box has the primary pipeline and secondary pipeline enter it at first and second locations, the system further comprising first and second means for sealing the primary pipeline to the secondary pipeline inside the third box proximate the first and second locations, each means for sealing having an aperture formed therein, and conduit means extending outside of the primary and secondary pipelines for communicating the apertures of the first and second means in airtight relation.

11. The flammable fluids handling system of claim 1, wherein the primary and secondary pipelines and the first through fifth containment boxes lie along a substantially linear line.

12. The flammable fluids handling system of claim 1, wherein the second and fourth containment boxes each include means for sensing the presence of liquid collected therein and shutting down the flow of liquid in the primary pipeline to a flammable fluids dispensing device with which the containment box is associated.

13. The flammable fluids handling system of claim 1, wherein relative depths of the primary pipeline, as it enters each of the containment boxes along the same primary pipeline, alternates between greater and lesser depths relative to each adjacent box, the first and second box sizes being the same.

14. The flammable fluids handling system of claim 1, wherein all of the first, second, third, fourth and fifth containment boxes have a uniform depth dimension, even though the relative depth of the primary pipeline at each box varies.

15. The flammable fluids handling system of claim 1, further comprising an impact valve disposed in each containment box, and a flammable fluids dispensing unit directly above each containment box.

16. In a flammable fluids handling system, wherein there is a primary pipeline, a secondary pipeline around at least a portion of the primary pipeline, and at least first, second, third, and fourth adjacent flammable fluids containment boxes located along the primary and secondary pipelines, the improvement wherein the relative depth of the primary pipeline in the first box is at a first depth and the relative depth of the primary pipeline in the second box is at a second depth greater than the first, the relative depth in the third box of the primary pipeline is less than the second depth, and the relative depth of the primary pipeline in the fourth box is a fourth depth greater than the third depth, such that the primary pipeline and secondary pipeline are inclined downward from the first box and third box to the second box located therebetween, and from the third box to the fourth box, whereby the second box and fourth box represent gravitational low points of the primary pipeline and secondary pipeline for the first, second, third, and fourth boxes, wherein the second and fourth boxes each contain a primary pipeline leak detection system for detecting flammable fluids leaking from the primary pipeline to a space between the primary pipeline and secondary pipeline by means of the flammable fluid flowing through the secondary pipeline to at least one of the second box and the fourth box through an aperture formed in the secondary pipeline in closed communication with the primary pipeline leak detection system, wherein the second and fourth containment boxes each include means for sensing the presence of liquid collected therein and shutting down the flow of liquid in the primary pipeline to a flammable fluids dispensing device with which the containment box is associated, and wherein each box has a means for detecting leaking fluid collecting in each box leaking from the secondary pipeline and any flammable fluids handling equipment located in each box.

17. The flammable fluids handling system of claim 16 wherein the primary pipeline and secondary pipeline enter each of the second and fourth boxes in two places, and there are means for sealing the primary pipeline to the secondary pipeline at each place, the leak detection system comprising an aperture formed in each means for sealing.

18. The flammable fluids handling system of claim 16, wherein each box has a means for detecting leaking fluid collecting in each box, whereby leaking fluid from the secondary pipeline and any flammable fluids handling equipment located in each box may be detected.

19. The flammable fluids handling system of claim 16, wherein relative depths of the primary pipeline, as it enters each of the containment boxes along the same primary pipeline, alternates between greater and lesser depths relative to each adjacent box.

20. The flammable fluids handling system of claim 16, wherein at least the third box has the primary pipeline and secondary pipeline enter it at first and second locations, the system further comprising first and second means for sealing the primary pipeline to the secondary pipeline inside the third box proximate the first and second locations, each means for sealing having an aperture formed therein, and conduit means extending outside of the primary and secondary pipelines for communicating the apertures of the first and second means in airtight relation.

21. The flammable fluids handling system of claim 16, wherein all of the first, second, third and fourth containment boxes have a uniform depth dimension, even though the relative depth of the primary pipeline at each box varies.

22. The flammable fluids handling system of claim 16, further comprising an impact valve disposed in each containment box, and a flammable fluids dispensing unit directly above each containment box.

23. In a flammable fluids handling system, wherein there is a primary pipeline, a secondary pipeline around at least a portion of the primary pipeline, and at least first, second, third, fourth and fifth adjacent flammable fluids containment boxes located along the primary and secondary pipelines, the improvement wherein the relative depth of the primary pipeline in the first box is at a first depth relative to a level ground, the relative depth of the primary pipeline in the second box is at a second depth greater than the first relative to the level ground, the relative depth of the primary pipeline in the third box is a third depth which is less than the second depth, the relative depth of the primary pipeline in the fourth box is a fourth depth which is greater than the third depth, and the relative depth of the primary pipeline in the fifth box is a fifth depth which is less than the fourth depth, and the primary pipeline and secondary pipeline are inclined downward from the first box and third box to the second box located therebetween, and from the third box and from the fifth box to the fourth box located therebetween whereby the second box represents a gravitational low point of the primary pipeline and secondary pipeline for the first, second and third boxes, and the fourth box represents a gravitational low point of the third, fourth and fifth boxes, wherein the second and fourth boxes each contain a primary pipeline leak detection system for detecting flammable fluids leaking from the primary pipeline to a space between the primary pipeline and secondary pipeline by means of the flammable fluid flowing through the secondary pipeline to one of the second and fourth boxes through an aperture formed in the secondary pipeline in closed communication with the primary pipeline leak detection system, and wherein each box has a means for detecting leaking fluid collecting in each box, whereby leaking fluid from the secondary pipeline and any flammable fluids handling equipment located in each box may be detected.

* * * * *